United States Patent
Bridges

(10) Patent No.: US 8,452,993 B2
(45) Date of Patent: May 28, 2013

(54) CIRCUITS, SYSTEMS, AND METHODS FOR DYNAMICALLY CONTROLLING A POWER SUPPLY CONFIGURATION IN RESPONSE TO LOAD REQUIREMENTS FROM A DIGITAL CIRCUIT

(75) Inventor: Jeffrey T. Bridges, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 12/828,628

(22) Filed: Jul. 1, 2010

(65) Prior Publication Data

US 2012/0005491 A1    Jan. 5, 2012

(51) Int. Cl.
*G06F 1/00* (2006.01)
*G06F 1/32* (2006.01)
*H02J 7/34* (2006.01)

(52) U.S. Cl.
USPC .............................. 713/300; 713/320; 307/48

(58) Field of Classification Search
USPC ......................................................... 713/300
See application file for complete search history.

(56) References Cited

U.S. PATENT DOCUMENTS

| | | | | |
|---|---|---|---|---|
| 5,627,412 A * | 5/1997 | Beard | .............................. | 307/82 |
| 6,552,446 B1 * | 4/2003 | Lomba et al. | ................... | 307/48 |
| 6,683,798 B2 * | 1/2004 | Matsuura et al. | ................ | 363/17 |
| 6,920,763 B2 * | 7/2005 | Amundsen et al. | ............ | 62/55.5 |
| 7,283,070 B1 * | 10/2007 | Roy et al. | ......................... | 341/67 |
| 8,205,103 B2 * | 6/2012 | Kazama et al. | ................ | 713/300 |
| 2008/0168287 A1 | 7/2008 | Berry et al. | | |
| 2009/0070607 A1 | 3/2009 | Safford et al. | | |
| 2009/0089600 A1 | 4/2009 | Nousiainen | | |

OTHER PUBLICATIONS

International Search Report and Written Opinion—PCT/US2011/042481, International Search Authority—European Patent Office—Sep. 14, 2011.

* cited by examiner

*Primary Examiner* — Suresh Suryawanshi
(74) *Attorney, Agent, or Firm* — Nicholas J. Pauley; Peter Michael Kamarchik; Joseph Agusta

(57) ABSTRACT

Circuits, systems, and methods for dynamically controlling a power supply configuration in response to load requirements from a digital circuit are disclosed. To increase efficiency, the power supply is configurable to be switched into a lower capacity mode. To prevent the digital circuit from demanding capacity beyond the lower capacity mode of the power supply before the power supply can be switched into a higher capacity mode, at least one hardware interlock is employed. The hardware interlock(s) governs the power demand of the digital circuit from extending beyond the lower capacity mode of the power supply. If it is detected that the hardware interlock(s) limits power demand in the digital circuit beyond a power demand threshold, the power supply can be switched to the higher capacity mode. The hardware interlock(s) can then be disabled. In this manner, the power supply can dynamically provide increased capacity as demanded by the dynamic performance of the digital circuit.

31 Claims, 8 Drawing Sheets

CIRCUITS, SYSTEMS, AND METHODS FOR DYNAMICALLY CONTROLLING A POWER SUPPLY CONFIGURATION IN RESPONSE TO LOAD REQUIREMENTS FROM A DIGITAL CIRCUIT

BACKGROUND

I. Field of the Disclosure

The technology of the disclosure relates to controlling the configuration of a power supply providing power for a digital circuit, such as a central processing unit (CPU) as an example.

II. Background

A circuit may demand a dynamically varying amount of current from a power source at various times during operation. For example, a digital circuit, such as central processing unit (CPU) or digital signal processor (DSP) as examples, may require anywhere from a few milliAmps (mA) to one Amp (1.0 A) during operation depending on the type of operations being performed. The digital circuit may demand higher current levels during high current operations, such as when performing floating point operations as an example. The digital circuit may demand lower power levels during other periods, such as during sleep or idle modes, as examples.

Current may be supplied to a circuit by a power supply regulated by a voltage regulator regulating the voltage level supplied to the circuit. Losses may occur in the power supply and the voltage regulator. The ratio of the energy supplied to the digital circuit compared to the total energy consumed by the power supply is the efficiency of the power supply. The efficiency is between zero and one hundred percent (0-100%). Higher efficiencies are desirable to minimize the total system energy consumption required to operate the digital circuit. To minimize these losses and conserve power, power supplies are commonly designed with multiple capacity or current modes. As an example, a power supply may have a high current mode which uses pulse width modulation (PWM) to provide higher output current levels to a circuit. However, the efficiency of the power supply may be less in high current mode than it would be when employing a low current mode using pulse frequency modulation (PFM) to provide lower output current levels to a circuit. Thus, if the current level requirements of a circuit can be provided by a low current mode of the power supply, less loss will occur if the power supply is operated in low current mode as opposed to high current mode.

In this regard, it may be advantageous to configure a power supply providing power for a circuit into a low current mode to increase efficiency and reduce power losses as a result. For example, the power supply may be switched to low current mode when the circuit is placed in a sleep mode and current demand is within low current mode specifications. When the circuit is placed in a wake mode, as an example, the power supply can be switched to high current mode to supply higher current levels to the circuit. There may be times when current demand by the circuit is within low current mode specifications during wake or normal operating modes. If the power supply is placed in low current mode during these times, and the circuit subsequently demands higher current levels than can be supplied by the power supply in the low current mode, the power supply must be switched to a high current mode. However, detection of the increased current level demand by the circuit and switching of the power supply from low current mode to high current mode may not be completed before the circuit requires higher current levels. Power supply disruptions can occur, and performance issues or malfunctions can occur in the digital circuit as a result. Even with techniques that predict increases in current demand, the actual current demand by the circuit may vary and may not be reasonably predictable.

Thus, the circuit is operated in wake or normal operating modes with the power supply configured in high current mode to avoid performance issues due to power supply disruptions, even when the current demands of the circuit are usually within the low current mode specifications of the power supply. This causes the power supply to have excess capacity that can reduce efficiency of the power supply as a result since the circuit does not always require the high current mode of the voltage regulator.

SUMMARY OF THE DISCLOSURE

Embodiments disclosed in the detailed description include circuits, systems, and methods for dynamically controlling a power supply configuration in response to load requirements from a digital circuit. The power supply provides power for a digital circuit. To increase or optimize efficiency (i.e., operating efficiency) of the power supply, the power supply is configurable to be switched into a lower capacity mode, which may be a low current mode, when providing power to the digital circuit. To prevent the digital circuit from demanding capacity from the power supply beyond the lower capacity mode before the power supply can be switched into a higher capacity mode, which could otherwise result in improper operation of the digital circuit, at least one hardware interlock is employed. The at least one hardware interlock governs the power demand of the digital circuit when the power supply is in the lower capacity mode. In this manner, the at least one hardware interlock restricts the power demand of the digital circuit from extending beyond the lower capacity mode of the power supply.

However, if the at least one hardware interlock is limiting the power demand of the digital circuit beyond a power demand threshold, the power supply can be switched to the higher capacity mode to provide the increased capacity demands of the digital circuit while the at least one hardware interlock is still enabled. For example, performance of the digital circuit may be affected by its power demand. Thus, causing the power supply to be switched to the higher capacity mode may satisfy power demand of the digital circuit so as to not reduce performance. After the power supply is switched to the higher capacity mode, the at least one hardware interlock can be disabled so as to not govern power demand of the digital circuit. In this manner, the power supply can dynamically provide increased capacity as demanded by the power demand of the digital circuit without the power demand demands of the digital circuit exceeding the configured capacity of the power supply.

Thus, the embodiments disclosed herein allow a power supply to be configured in a lower capacity mode to increase efficiency when power demand of the digital circuit does not demand higher capacity from the power supply. However, the embodiments disclosed herein also allow the power supply to be dynamically configured to a higher capacity, less efficient mode when power demand of the digital circuit demands higher capacity. By employing the at least one hardware interlock, power demand of the digital circuit is governed until the power supply can be configured to a higher capacity mode so that the digital circuit does not demand capacity beyond a lower capacity mode of the power supply before the power supply is able to be reconfigured to the higher capacity mode.

In this regard, in one embodiment, a method of dynamically controlling a power supply configuration is provided.

The method comprises governing the power demand of a digital circuit using at least one hardware interlock when a current operating mode of a power supply providing power for the digital circuit is a lower capacity mode. The method further includes detecting when the at least one hardware interlock limits the power demand of the digital circuit. If the at least one hardware interlock limits the power demand of the digital circuit beyond a power demand threshold, the method includes generating an operating mode signal to set the current operating mode of the power supply to a higher capacity mode. The power supply may be configured to have a two or more capacity modes wherein the power supply can be configured into any of these capacity modes as part of the embodiments disclosed herein.

In another embodiment, a circuit is provided. The circuit is configured to dynamically control a power supply configuration. In this embodiment, the circuit includes at least one hardware interlock configured to govern the power demand of a digital circuit when an operating mode of a power supply providing power for the digital circuit is a lower capacity mode. A power demand monitor is also provided that is configured to detect if the at least one hardware interlock limits the power demand of the digital circuit. A capacity mode selector is also provided that is configured to generate an operating mode signal to set the current operating mode of the power supply to a higher capacity mode if the at least one hardware interlock limits the power demand of the digital circuit beyond a power demand threshold. The capacity mode selector may be configured to select a capacity mode for the power supply between two or more capacity modes wherein based on the number of capacity modes provided by the power supply.

DETAILED DESCRIPTION

Figure 1:
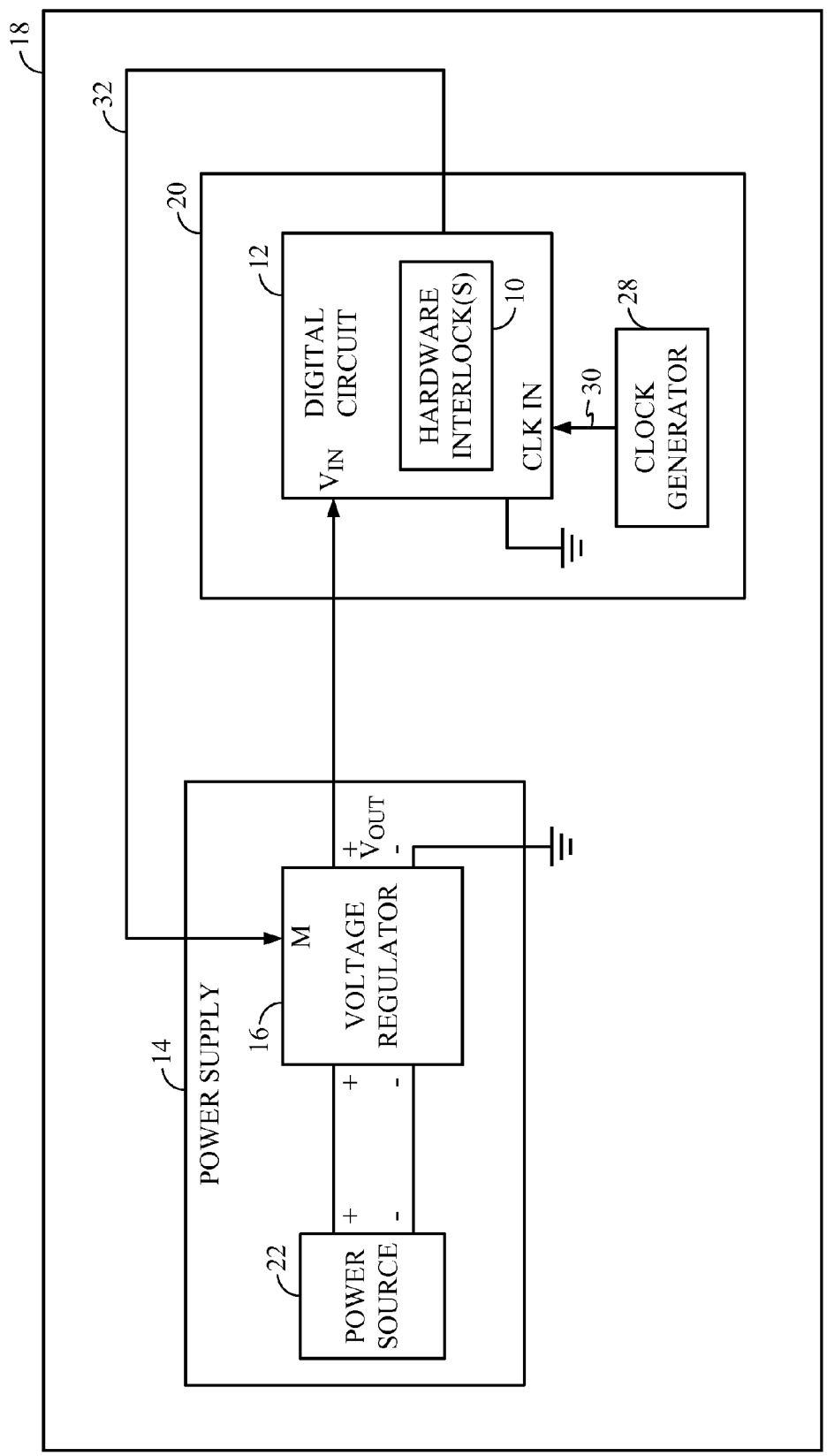
FIG. 1 is a schematic diagram of an exemplary hardware interlock employed in a digital circuit powered by a power supply employing a capacity mode switching voltage regulator.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include circuits, systems, and methods for dynamically controlling a power supply configuration in response to load requirements from a digital circuit. The power supply provides power for a digital circuit. To increase or optimize efficiency (i.e., operating efficiency) of the power supply, the power supply is configurable to be switched into a lower capacity mode, which may be a low current mode, when providing power to the digital circuit. To prevent the digital circuit from demanding capacity from the power supply beyond the lower capacity mode before the power supply can be switched into a higher capacity mode, which could otherwise result in improper operation of the digital circuit, at least one hardware interlock is employed. The at least one hardware interlock governs the power demand of the digital circuit when the power supply is in the lower capacity mode. In this manner, the at least one hardware interlock restricts the power demand of the digital circuit from extending beyond the lower capacity mode of the power supply.

If the at least one hardware interlock limits the power demand of the digital circuit beyond a power demand threshold, the power supply can be switched to the higher capacity mode to provide the increased capacity demands of the digital circuit while the at least one hardware interlock is still enabled. For example, performance of the digital circuit may be affected by its power demand. Thus, causing the power supply to be switched to the higher capacity mode may satisfy power demand of the digital circuit so as to not reduce performance. After the power supply is switched to the higher capacity mode, the at least one hardware interlock can be disabled so as to not govern power demand of the digital circuit. In this manner, the power supply can dynamically provide increased capacity as demanded by the power demand of the digital circuit without the power demands of the digital circuit exceeding the configured capacity of the power supply.

Thus, the embodiments disclosed herein allow a power supply to be configured in a lower capacity mode to increase efficiency when power demand of the digital circuit does not demand higher capacity from the power supply. However, the embodiments disclosed herein also allow the power supply to be dynamically configured to a higher capacity, less efficient mode when power demand of the digital circuit demands higher capacity. By employing the at least one hardware interlock, power demand of the digital circuit is governed until the power supply can be configured to a higher capacity mode so that the digital circuit does not demand capacity beyond a lower capacity mode of the power supply before the power supply is able to be reconfigured to the higher capacity mode. The power supply may be configured to have two or more capacity modes wherein the power supply can be configured into any of these capacity modes as part of the embodiments disclosed herein.

In this regard, FIG. 1 illustrates an exemplary schematic diagram of one or more hardware interlocks 10 (also referred to herein as "hardware interlock(s) 10") employed in a digital circuit 12. The digital circuit 12 is powered by a power supply 14 employing a capacity mode switching voltage regulator 16 (also referred to herein as "voltage regulator 16"). The hardware interlock(s) 10, digital circuit 12, and power supply 14 may all be included as part of a system 18, as illustrated in FIG. 1. The digital circuit 12 may be provided in a semiconductor die 20. The power supply 14 includes a power source 22 that is coupled to the voltage regulator 16 to maintain a constant or substantially constant voltage level ($V_{OUT}$) to provide power for the digital circuit 12. The power source 22 may be any type of power source, such as a battery for example. The power supply 14 may be configured to provide power for other electronic devices in addition to the digital circuit 12. Alternatively, the power supply 14 may be a dedicated power supply for the digital circuit 12. The digital circuit 12 in this embodiment is a synchronous digital circuit that includes components synchronized by a clock signal. In this regard, a clock generator 28 generates a clock signal 30 input into a clock input (CLK IN) in the digital circuit 12, as illustrated in FIG. 1. If the digital circuit 12 were a central processing unit (CPU) as an example, the clock signal 30 would be used to provide clock cycles to control the synchronous execution of instructions.

To provide for the capability of dynamically configuring the power supply 14 in response to the power demand of the digital circuit 12, the power supply 14 in this embodiment is provided as a switching-mode power supply (SMPS). The voltage regulator 16 is a switching voltage regulator in this example to allow the power supply 14 to be configured to maximize efficiency. The power supply 14 includes two or more capacity or current modes for regulating output current. Each capacity or current mode has different efficiency characteristics so that the power supply 14 can be configured or switched to provide the most efficient operation while meeting the power demands from the digital circuit 12. Lower capacity modes may have greater loss efficiencies than higher capacity modes. As used herein, lower capacity mode means a capacity mode that has a lower maximum capacity power output or lower range of power output than at least one highest capacity mode of a power supply. Higher capacity mode means a capacity mode that has a higher maximum capacity power output or higher range of power output than at least one lower capacity mode of a power supply.

Figure 2:
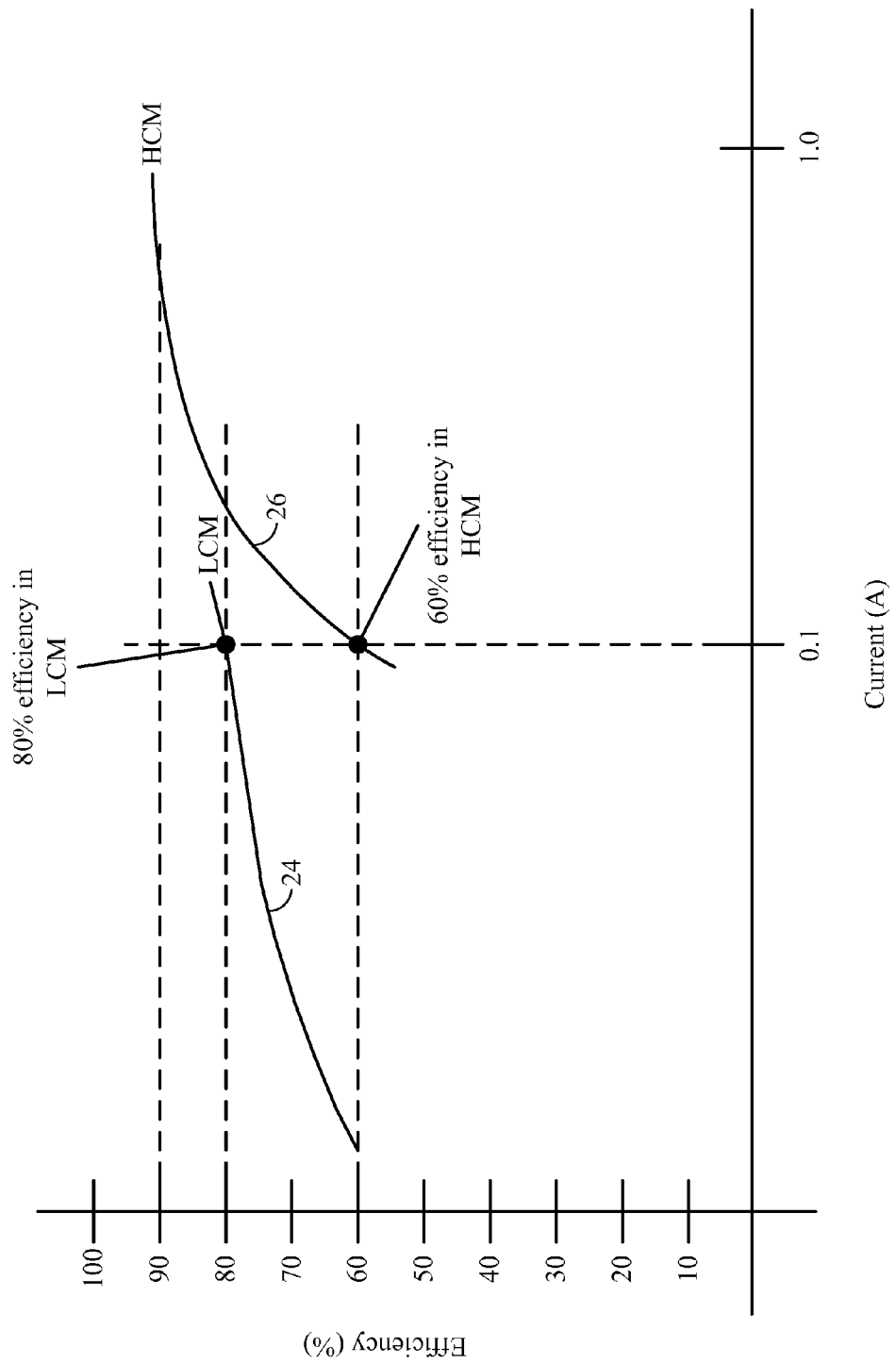
FIG. 2 illustrates exemplary efficiencies of a power supply as a function of current and capacity mode.

For example, if the power supply 14 in FIG. 1 were configurable to provide two capacity modes, as an example, a low current mode (LCM) and high current mode (HCM), the efficiency curves of the LCM and HCM may be as illustrated in FIG. 2. As illustrated therein, the LCM and HCM of the power supply 14 may have an LCM efficiency curve 24 and an HCM efficiency curve 26, respectively. The HCM of the power supply 14 may employ pulse width modulation (PWM) to sufficiently provide output currents from 100 milliAmps (mA) to 1.0 Amp (A) to the digital circuit 12, as illustrated in FIG. 2. However, the efficiency of the power supply 14 may be less in HCM than when the power supply 14 is in LCM. For example, the LCM of the power supply 14 may employ pulse frequency modulation (PFM) to sufficiently provide lower output currents, such as less than 100 mA as an example, as illustrated in FIG. 2. In this example, as illustrated in FIG. 2, the efficiency of the power supply 14 supplying 100 mA to the digital circuit 12 may be sixty percent (60%) in HCM, but may be eighty percent (80%) in LCM. Thus, in this example, less loss occurs in the power supply 14 when in LCM. Thus, it would be advantageous for the power supply 14 to be configured in LCM when providing power to the digital circuit 12 to conserve power if the power demands of the digital circuit 12 are within the LCM specifications of the power supply 14. Note that although only two exemplary efficiency curves are illustrated in FIG. 2 for the power supply 14, the power supply 14 could include more than two capacity modes, wherein additional efficiency curves would be present for each capacity mode.

The load or power demands of the digital circuit 12 on the power supply 14 can vary. For example, if the digital circuit 12 were a CPU, execution of certain types of instructions may demand more current than others. For example, complex operations, such as multiply instructions and other floating-point instructions, may demand more current from the power supply 14 than other types of instructions or when the digital circuit 12 is idle. As previously discussed, it would be advantageous to configure the power supply 14 to operate in a lower capacity mode which may have a greater efficiency than a higher capacity mode(s). However, as previously discussed, the current levels of the lower capacity mode of the power supply 14 may be limited below maximum current output levels of the power supply 14. Because the power demand (i.e., current and/or voltage levels) of the digital circuit 12 can vary, the power demand may exceed the lower capacity mode requirements of the digital circuit 12. Thus, the digital circuit 12 in this embodiment is configured to generate a capacity selector signal on a capacity mode selector line 32 (FIG. 1) communicated to a mode input (M) on the voltage regulator 16 of the power supply 14. If the power demand of the digital circuit 12 exceeds the abilities of the lower capacity mode of the power supply 14, the digital circuit 12 can dynamically generate a capacity selector signal on the capacity mode selector line 32 to instruct the voltage regulator 16 to switch to a higher capacity mode that can satisfy the power demand of the digital circuit 12.

In order for the digital circuit 12 to dynamically switch the capacity mode of the power supply 14 in this example, the digital circuit 12 recognizes the increased power demand of the digital circuit 12 and generates the capacity mode signal over the capacity mode selector line 32 to instruct the voltage regulator 16 to switch to a higher capacity mode. The voltage regulator 16 switches to a higher capacity mode in response. Before all of these tasks occur, the digital circuit 12 may have already increased the power demand on the power supply 14, which may be outside the capabilities of the current lower capacity mode and thus cause a disruption in power and improper operation of the digital circuit 12 as a result. In this regard, to prevent the digital circuit 12 from demanding capacity from the power supply 14 beyond the lower capacity mode before the power supply 14 can be switched into a higher capacity mode, the hardware interlock(s) 10 is employed. The hardware interlock(s) 10 restricts the power demand of the digital circuit 12 from extending beyond the lower capacity mode of the power supply 14. In this regard, the power demand of the digital circuit 12 is in turn governed to be within the capabilities of the current lower capacity mode of the power supply 14.

As discussed above, by employing the hardware interlock(s) 10, power demand of the digital circuit 12 is governed so that the current lower capacity mode of the power supply 14 can meet the power demand of the digital circuit 12 due to variances in power demand levels. However, the hardware interlock(s) 10 limit power demand of the digital circuit 12 when the power demand of the digital circuit 12 exceeds the capacity abilities of the current lower capacity mode of the power supply 14. It may not be desirable to always limit the power demand of the digital circuit 12. If it is not desired to limit power demand of the digital circuit 12, the hardware interlock(s) 10 are not enabled and the power supply 14 may have be to configured to operate at a higher capacity, less efficient mode to respond to dynamic increases in power demand even at times when the digital circuit 12 is operating at power demand levels that can be satisfied by lower capacity, more efficient modes of the power supply 14. This results in a lower efficiency of the power supply 14 at times when the power demand levels of the digital circuit 12 could be satisfied by a lower capacity mode of the power supply 14. Hence, embodiments disclosed herein provide circuits, systems, and methods to increase efficiency of the power supply 14 without exceeding the capacity mode of the power supply 14. In this regard, the embodiments disclosed herein allow the power supply 14 to be configured to operate in a lower capacity mode while also being able to be dynamically reconfigured to a higher capacity mode when the power demand of the digital circuit 12 increases.

Figure 3:
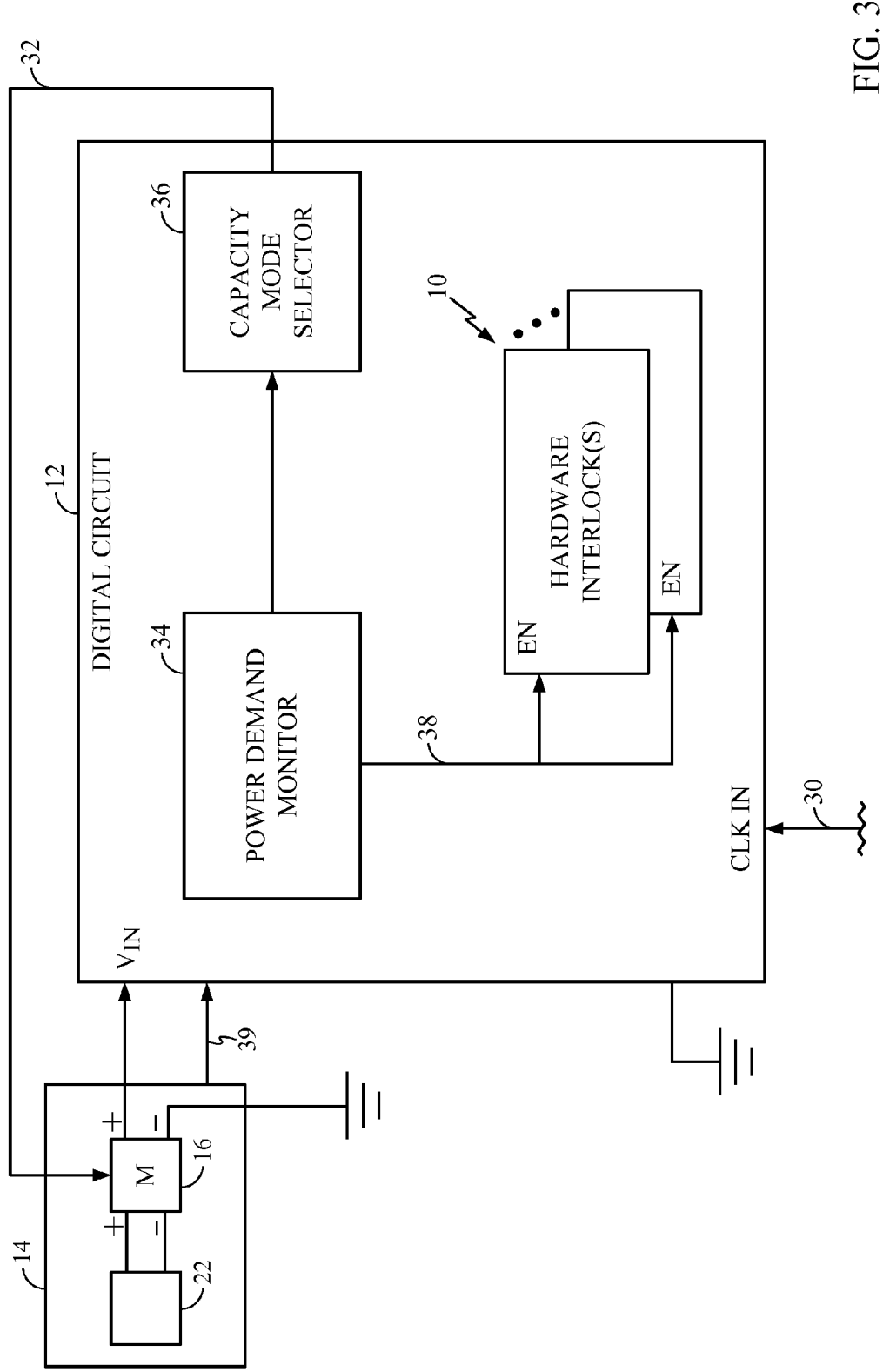
FIG. 3 is a schematic diagram of the digital circuit in FIG. 1 further including a power demand monitor and capacity mode selector for the power supply.

In this regard, FIG. 3 illustrates an embodiment of the digital circuit 12 of FIG. 1 in more detail. As illustrated therein, the digital circuit 12 includes one or more of the hardware interlocks 10, a power demand monitor 34, and a capacity mode selector 36. The power supply 14 was previously configured to operate in a lower capacity mode. To prevent the power demands of the digital circuit 12 from exceeding the lower capacity mode capabilities of the power supply 14, the hardware interlock(s) 10 is enabled. The hardware interlock(s) 10 is enabled by the power demand monitor 34 in the embodiment of FIG. 3 via enable lines 38. The hardware interlock(s) 10 is enabled to govern power demands of the digital circuit 12 and prevent the power demands of the digital circuit 12 from exceeding the current lower capacity mode of the power supply 14. The power demand monitor 34 is provided to monitor the power demand of the digital circuit 12 to detect when the hardware interlock(s) 10 is limiting power demand of the digital circuit 12. In one embodiment, as illustrated in FIG. 3, the power demand of the digital circuit 12 is determined by the power demand monitor 34. If the hardware interlock(s) 10 does not limit the power demand of the digital circuit 12 beyond a power demand threshold, which may be a permanent or programmable setting for the digital circuit 12, the digital circuit 12 continues to operate with the power supply 14 operating in the lower capacity mode. The power supply 14 continues to operate in the lower operating mode.

The power demand monitor 34 can be provided in discrete hardware or circuits, software, or a combination of both. If the digital circuit 12 is a CPU, the power demand monitor 34 may be employed as part of the CPU. Further, the power demand monitor 34 is illustrated in FIG. 3 as being included in the digital circuit 12, but the power demand monitor 34 may also be physically located external to the digital circuit 12, if desired.

If the hardware interlock(s) 10 limit the power demand of the digital circuit 12 beyond a power demand threshold while the power supply 14 is operating in a lower performance mode, this means the hardware interlock(s) 10 may be limiting performance of the digital circuit 12 beyond desired limits according to the power demand threshold setting for the digital circuit 12. In this regard, the capacity mode selector 36 generates an operating mode signal over the capacity mode selector line 32 to set the current operating mode of the power supply 14 to a higher capacity mode that will be sufficient to satisfy the power demand of the digital circuit 12 governed by the hardware interlock(s) 10. In the embodiment of FIG. 3, the power demand monitor 34 communicates to the capacity mode selector 36 that power demand of the digital circuit 12 is exceeding the power demand threshold while the power supply 14 is operating in a lower performance mode. The capacity mode selector 36 can be provided in discrete hardware or circuits, software, or a combination of both. If the digital circuit 12 is a CPU, the capacity mode selector 36 may be employed as part of the CPU. Further, the capacity mode selector 36 is illustrated in FIG. 3 as being included in the digital circuit 12, but the capacity mode selector 36 may also be physically located external to the digital circuit 12, if desired.

After the power supply 14 has been given sufficient response time to switch into a higher capacity mode in response to the operating mode signal from the capacity mode selector 36, the hardware interlock(s) 10 can be disabled since the power supply 14 can now respond to the increase in power demands of the digital circuit 12, if present. For example, the power supply 14 may provide a signal over a capacity mode line 39 to the digital circuit 12 indicating the capacity mode of the power supply 14, as illustrated in FIG. 3. The capacity mode line 39 could be coupled to the power demand monitor 34, for example, if the power demand monitor 34 is responsible for determining when the power supply 14 has switched into a particular capacity mode in response to the operating mode signal from the capacity mode selector 36. The digital circuit 12 is then allowed to operate at increased normal power demand levels with the power supply 14 operating in a higher capacity mode to be able to satisfy the increased power demands of the digital circuit 12 as a result. In this manner, the power supply 14 can dynamically provide increased capacity as demanded by the power demand of the digital circuit 12 without the power demands of the digital circuit 12 exceeding the current lower capacity mode of the power supply 14 before the power supply 14 can be reconfigured to a higher capacity mode.

Alternatively, the power supply 14 could signal back to the power demand monitor 34 when the power supply 14 has switched into a higher capacity mode to trigger the disabling of the hardware interlock(s) 10. However, the current operating mode of the power supply 14 is now in a higher capacity mode which is less efficient. If the power demand of the digital circuit 12 does not require the higher capacity mode of the power supply 14, excess capacity exists in the power supply 14 resulting in a lower efficiency in this embodiment. Thus, it is desired, when possible, to switch the power supply 14 back to a lower capacity mode to increase operating efficiency of the power supply 14 and reduce excess capacity as a result. In this regard, as illustrated in the flowchart in FIGS. 4A and 4B, the power demand monitor 34 monitors the performance of the digital circuit 12 to detect if enabling the hardware interlock(s) 10 would limit power demand of the digital circuit 12 beyond the power demand threshold. In the embodiment of FIG. 3, the performance information regarding the digital circuit 12 is provided by the hardware interlock(s) 10 to the power demand monitor 34. If enablement of the hardware interlock(s) 10 would limit power demand of the digital circuit 12 beyond the power demand threshold, this means the power demand of the digital circuit 12 still requires increased capacity from the power supply 14, and the power supply 14 should be retained in a higher capacity mode.

If enabling the hardware interlock(s) 10 would not limit the power demand of the digital circuit 12 beyond the power demand threshold, this means the power demand of the digital circuit 12 does not presently require the increased capacity from the power supply 14. In this regard, the capacity mode selector 36 dynamically generates an operating mode signal on the capacity mode selector line 32 to set the current operating mode of the power supply 14 to a lower capacity mode. The hardware interlock(s) 10 is enabled so that the power demands of the digital circuit 12 cannot exceed the capabilities of the lower capacity mode of the power supply 14. The hardware interlock(s) 10 may be enabled in response to a capacity mode signal received on the capacity mode line 39 indicating the power supply 14 has switched into the lower capacity mode. The hardware interlock(s) 10 is enabled until such time that the hardware interlock(s) 10 is limiting the power demand of the digital circuit 12 beyond the power demand threshold. In this case, the power supply 14 is reconfigured to a higher capacity mode, as previously discussed.

The hardware interlock(s) 10 is provided within the digital circuit 12 in this embodiment, as illustrated in FIG. 3. However, the hardware interlock(s) 10 could be provided externally to the digital circuit 12 as well. The hardware interlock(s) 10 is provided in this embodiment without the use of software, so that the hardware interlock(s) 10 can respond quickly to govern an attempted increase in power demand by the digital circuit 12 before the increased power demand places increased load requirements on the power supply 14 that cannot be satisfied by the current lower capacity mode. Various examples and embodiments of a hardware interlock(s) 10 are discussed later in this disclosure.

Figure 4A:
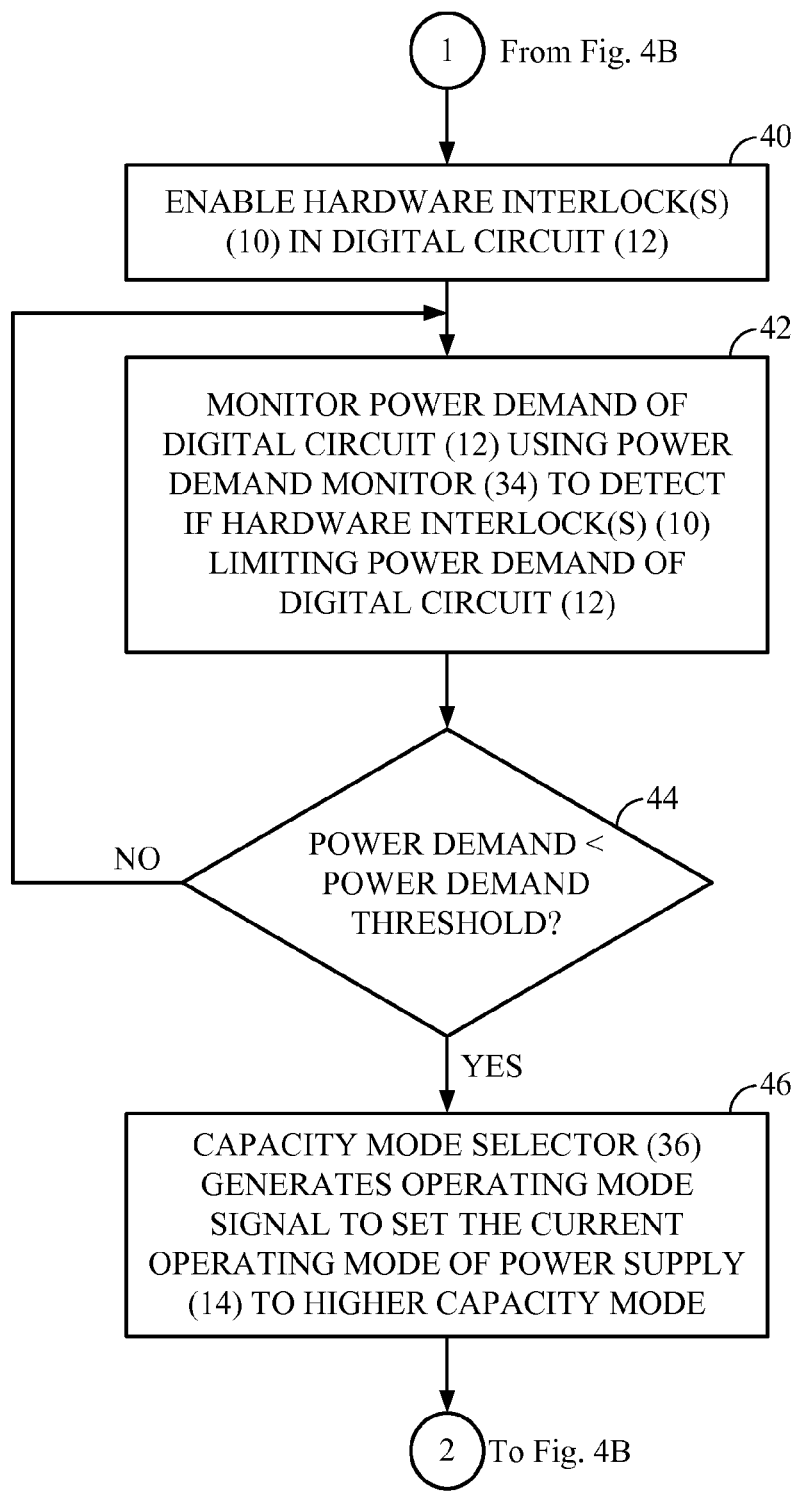
FIGS. 4A and 4B are flowcharts providing an exemplary process for dynamically controlling a power supply capacity mode when the power supply is configured in a lower capacity mode and a higher capacity mode.
Figure 4B:
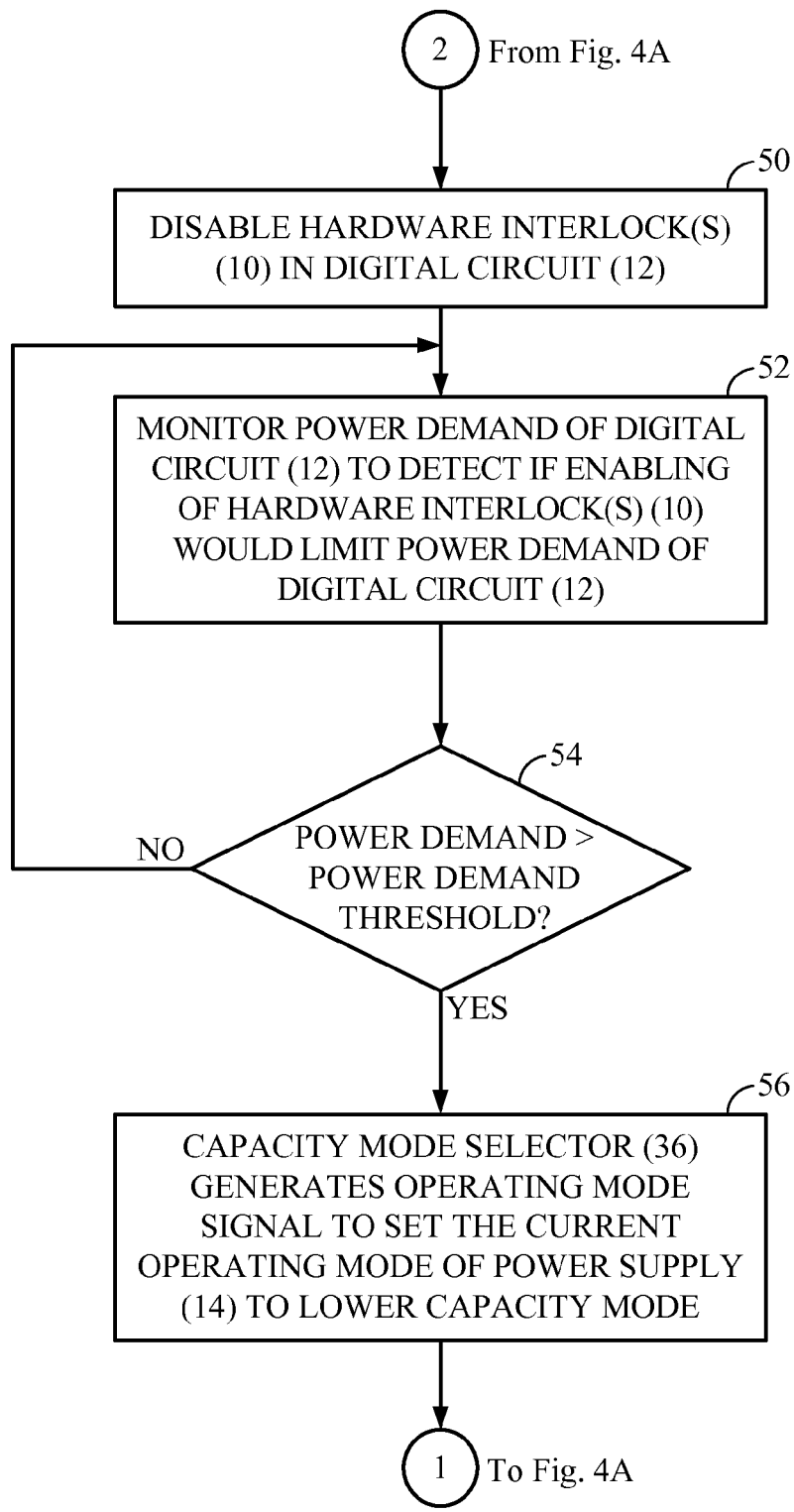

The flowcharts in FIGS. 4A and 4B also illustrate exemplary operation of the system 18 in FIG. 3. In this regard, to prevent the power demands of the digital circuit 12 from exceeding the lower capacity mode capabilities of the power supply 14, the hardware interlock(s) 10 is enabled (block 40 in FIG. 4A). The power demand monitor 34 monitors the power demand of the digital circuit 12 to detect when the hardware interlock(s) 10 is limiting power demand of the digital circuit 12 (block 42 in FIG. 4A). If the hardware interlock(s) 10 does not limit the power demand of the digital circuit 12 beyond a power demand threshold (block 44 in FIG. 4A), the digital circuit 12 continues to operate with the power supply 14 operating in the lower capacity mode (block 40 in FIG. 4A). The power supply 14 continues to operate in the lower operating mode.

However, if the hardware interlock(s) 10 limit the power demand of the digital circuit 12 beyond a power demand threshold while the power supply 14 is operating in a lower performance mode (block 44 in FIG. 4A), this means the hardware interlock(s) 10 may be limiting performance of the digital circuit 12 beyond desired limits according to the power demand threshold setting for the digital circuit 12. In this regard, the capacity mode selector 36 generates an operating mode signal over the capacity mode selector line 32 to set the current operating mode of the power supply 14 to a higher capacity mode that will be sufficient to satisfy the power demand of the digital circuit 12 governed by the hardware interlock(s) 10 (block 46 in FIG. 4A).

After the power supply 14 has been given sufficient response time to switch into a higher capacity mode in response to the operating mode signal from the capacity mode selector 36, the hardware interlock(s) 10 can be disabled since the power supply 14 can now respond to the increase in power demands of the digital circuit 12, if present (block 50 in FIG. 4B). The digital circuit 12 is then allowed to operate at increased normal power demand levels with the power supply 14 operating in a higher capacity mode to be able to satisfy the increased power demands of the digital circuit 12 as a result.

If the power demand of the digital circuit 12 does not require the higher capacity mode of the power supply 14, excess capacity exists in the power supply 14 resulting in a lower efficiency in this embodiment. In this regard, as illustrated in the flowchart in FIG. 4B, the power demand monitor 34 monitors the performance of the digital circuit 12 to detect if enabling the hardware interlock(s) 10 would limit power demand of the digital circuit 12 beyond the power demand threshold (block 52 in FIG. 4B). If enablement of the hardware interlock(s) 10 would limit power demand of the digital circuit 12 beyond the power demand threshold (block 54 in FIG. 4B), this means the power demand of the digital circuit 12 still requires increased capacity from the power supply 14, and the power supply 14 should be retained in a higher capacity mode (block 52 in FIG. 4B).

If enabling the hardware interlock(s) 10 would not limit power demand of the digital circuit 12 beyond the power demand threshold (block 54 in FIG. 4B), this means the power demand of the digital circuit 12 does not presently require the increased capacity from the power supply 14. In this regard, the capacity mode selector 36 dynamically generates an operating mode signal on the capacity mode selector line 32 to set the current operating mode of the power supply 14 to a lower capacity mode (block 56 in FIG. 4B). The process returns to block 40 in FIG. 4A, whereby the hardware interlock(s) 10 is enabled so that the power demands of the digital circuit 12 cannot exceed the capabilities of the lower capacity mode of the power supply 14 until such time that the hardware interlock(s) 10 is limiting the power demand of the digital circuit 12 beyond the power demand threshold. In this case, the power supply 14 is reconfigured to a higher capacity mode, as previously discussed and illustrated in blocks 40-46 in FIG. 4A. The process in FIGS. 4A and 4B continues in a looping process with the operating mode of the power supply 14 being reconfigured based on the power demand of the digital circuit 12.

Figure 5:
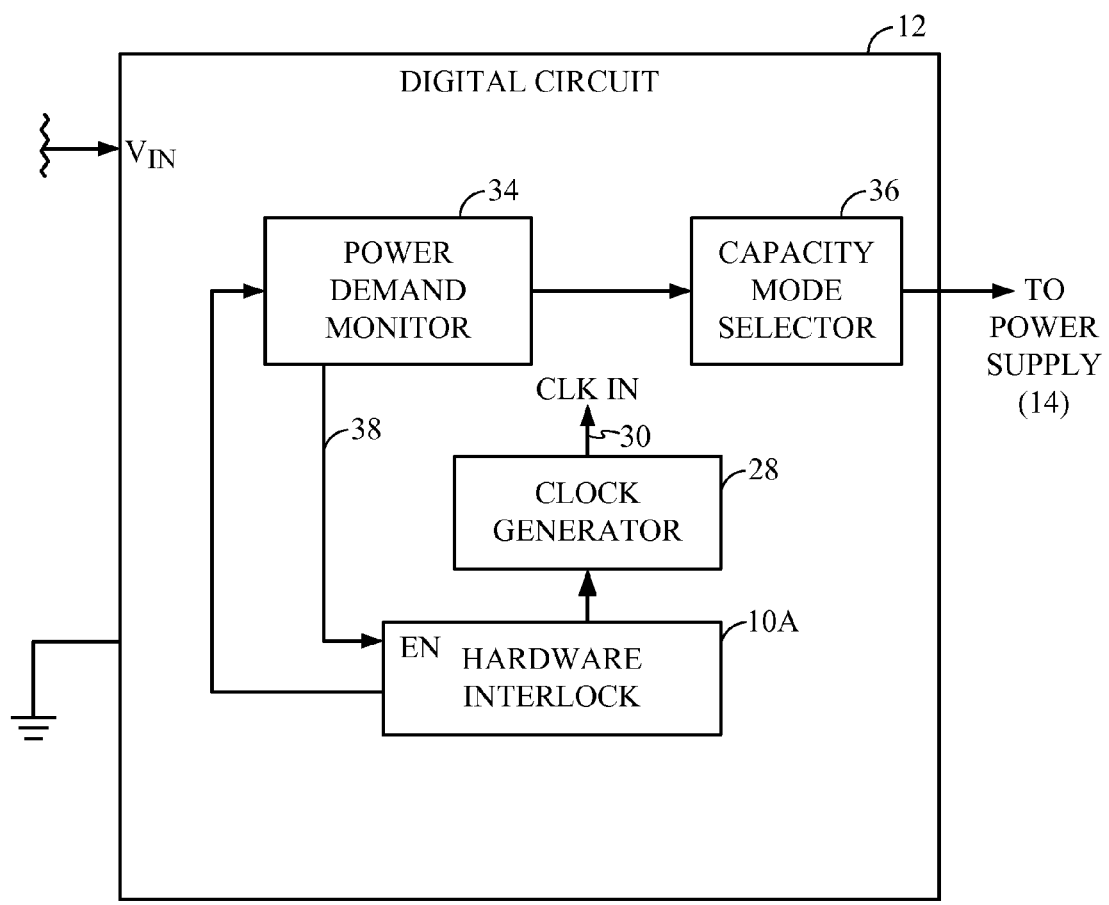
FIG. 5 is the digital circuit of FIG. 1 employing an operating frequency limiter hardware interlock.

Different types of hardware interlocks 10 may be provided. The disclosure and embodiments disclosed herein are not limited to any particular type or form of hardware interlock(s) 10. For example, FIG. 5 illustrates the digital circuit 12 of FIG. 1 employing an operating frequency limiter hardware interlock(s) 10A to govern power demand by the digital circuit 12 by limiting the operating frequency of the digital circuit 12. Lower operating frequencies generally require lower power requirements. Thus, by limiting the operating frequency of the digital circuit 12, the power demand of the digital circuit 12 are limited as a result. However, performance of the digital circuit 12 can also be limited as a result. In this embodiment, the operating frequency limiter hardware interlock(s) 10A is communicatively coupled to the clock generator 28. The operating frequency limiter hardware interlock(s) 10A controls the clock speed of the clock signal 30 generated by the clock generator 28. In this regard, in this embodiment, the power demand monitor 34 can enable a limit on the clock speed of the clock signal 30 by enabling the operating frequency limiter hardware interlock(s) 10A, which in turn limits the clock signal 30 generated by the clock generator 28. Different methods of controlling the clock speed of the clock signal 30 may be employed. For example, a control register may be employed in the operating frequency limiter hardware interlock(s) 10A to control the clock speed of the clock signal 30. The power demand monitor 34 may enable the operating frequency limiter hardware interlock(s) 10A by writing data into the control register.

The hardware interlock(s) 10 can also be provided or configured to limit the power demand of the digital circuit 12 in other ways other than restricting the frequency of the clock signal 30 generated by the clock generator 28. For example, if the digital circuit 12 is a CPU, the hardware interlock(s) 10 can be configured to restrict the clock speed of the CPU even if the clock signal 30 is provided at a higher frequency. For example, if the frequency of the clock signal 30 is 1.0 GigaHertz (GHz), the power demand of the CPU may be outside of capacity capabilities of the power supply 14 in a lower capacity mode. Thus, the hardware interlock(s) 10 could be configured to slow the internal clock of the CPU to a frequency less than the frequency of the clock signal 30, for example, 400 Hz in this example. The hardware interlock(s) 10 can be configured to provide internal clock speeds that correspond to the various lower capacity modes of the power supply 14. The power demand monitor 34 could be configured to determine the number of times that the internal clock speed was reduced by the hardware interlock(s) 10. For example, the power demand monitor 34 could maintain this number in a counter.

If the count in the counter were to exceed a defined threshold count indicative of an unacceptable power demand of the digital circuit 12, the power demand monitor 34 could then cause the capacity mode selector 36 to cause the power supply 14 to switch to a higher capacity mode in response, as previously described with regard to FIGS. 4A and 4B.

As another example, the hardware interlock(s) 10 could be configured to limit high current demand functions by the digital circuit 12. For example, if the digital circuit 12 is a CPU, limiting high current demand instruction types or the number of high current demand instruction types over a period of time can also govern power demand of the digital circuit 12. For example, complex instructions, such as multiply instructions and other floating-point instruction types, may incur more current demand by the digital circuit 12 than other instructions or when the digital circuit 12 is idle. Thus, by limiting high current demand instructions executed by the digital circuit 12, the power demand by the digital circuit 12 can be governed. Thus, limiting high current demand instructions executed by the digital circuit 12 can be another form of a hardware interlock(s) 10.

Figure 6:
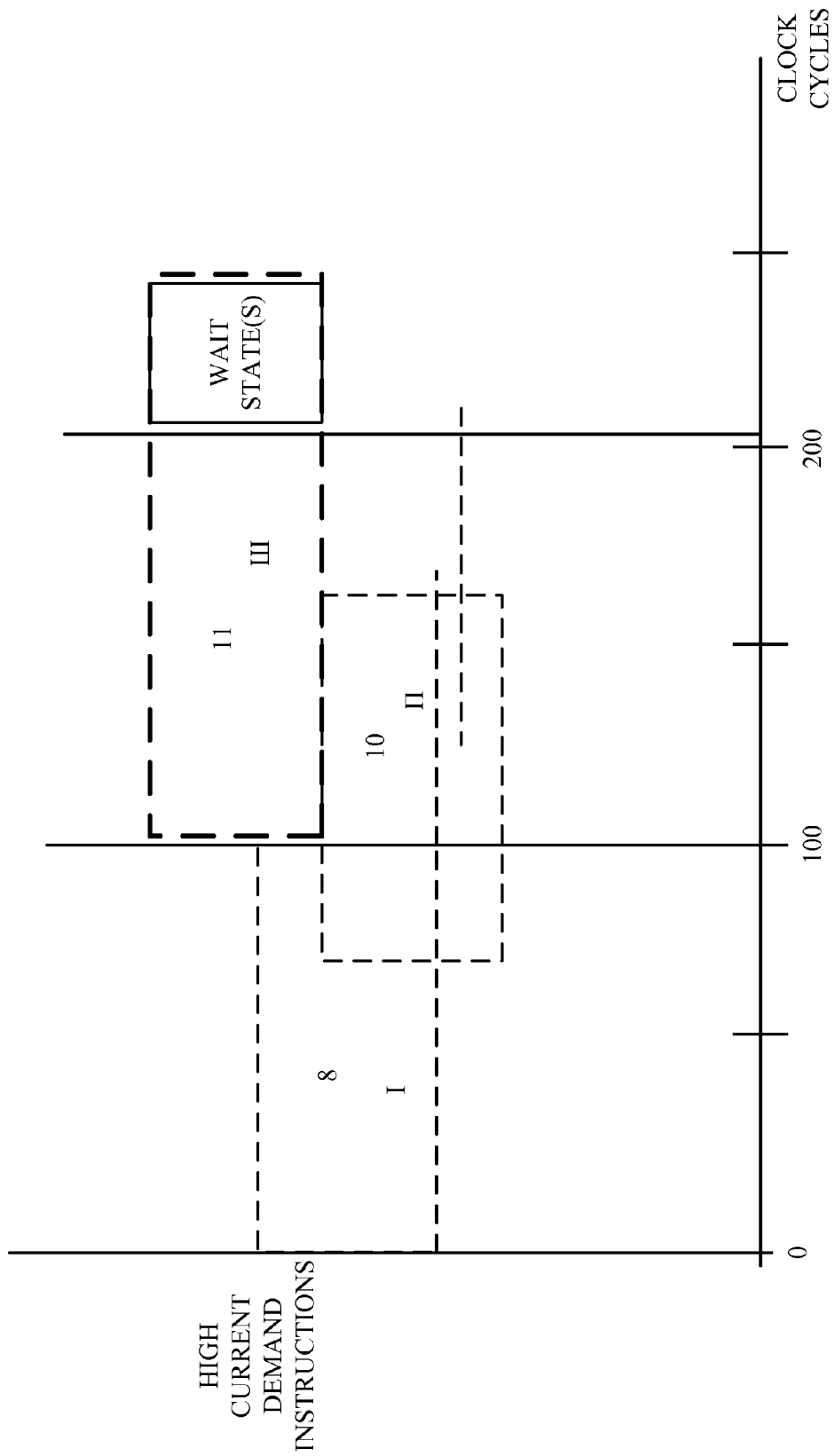
FIG. 6 is an exemplary diagram illustrating an instruction executing limiter hardware interlock.

For example, as illustrated in FIG. 6, one method for providing a hardware interlock(s) 10 that limits high current demand instruction execution is by tracking the number of high current demand instructions to be executed by the digital circuit 12. For example, it may be determined that the digital circuit 12 cannot execute more than ten (10) high current demand instructions over any one hundred (100) clock cycle period. The limits on high current demand instruction executions enforced by the hardware interlock(s) 10 can be set according to the digital circuit 12 and the power demands placed on the power supply 14 according to its lower capacity mode(s).

Alternatively, the hardware interlock(s) 10 could be configured to limit the number of high current demand instruction execution over a running average of time. For example, the lower capacity mode(s) of the power supply 14 may be based on average current demand rates rather than a peak current demand. In this regard, for example, the hardware interlock(s) 10 could maintain a count in a counter that tracks when the number of high current demand instructions executed in a given time period exceeds a defined threshold number. The threshold number is based on the capacity of the power supply 14 and the current demand characteristics of the digital circuit 12. Each time the number of high current demand instructions executed in a given time period exceeds a defined threshold number, the count could be increased as an example. When the number of high current demand instructions executed in the given time period does not exceed the defined threshold number, the count could be decreased. The power demand monitor 34 could be configured to monitor the count in the counter. If the count in the counter reached a defined threshold count, the power demand monitor 34 could cause the capacity mode selector 36 to cause the power supply 14 to switch to a higher capacity mode in response, as previously described with regard to FIGS. 4A and 4B.

For example, window I in FIG. 6 illustrates eight (8) high current demand instructions executed by the digital circuit 12 over the first one hundred (100) clock cycles. Window II in FIG. 6 illustrates ten (10) high current demand instructions executed by the digital circuit 12 in a given one hundred (100) clock cycle window. In this example, the digital circuit 12 may demand an average of 1000 milliAmps (ma) when executing one hundred (100) lower current demand instructions in a one hundred (100) cycle period at 1.0 Volt (V) when the digital circuit 12 is clocked at 1.0 GHz. The digital circuit 12 may demand an average of 2000 mA when executing one hundred (100) high current demand instructions in a one hundred (100) cycle period at 1.0 V when the digital circuit is clocked at 1.0 GHz. Thus in this example, the digital circuit 12 executing ten (10) high current instructions and ninety (90) low current instructions in a one hundred (100) cycle period may result in an average current demand of 1100 mA by the digital circuit 12. If the capacity of the power supply 14 in a lower capacity mode cannot exceed 1100 mA in a one hundred (100) cycle period at 1.0 GHz, the hardware interlock(s) 10 could be engaged to prevent the digital circuit 12 from executing more than ten (10) high current instructions in a one hundred (100) cycle period. Thus, in this example of windows I and II in FIG. 6, the hardware interlock(s) 10 would not limit power demand of the digital circuit 12 since the demand of the digital circuit 12 would not exceed the capacity of the lower capacity mode of the power supply 14.

However, in window III in FIG. 6, eleven (11) high current demand instructions are scheduled to be executed by the digital circuit 12 in a one hundred (100) cycle period. Thus, the hardware interlock(s) 10 may allow the first ten (10) high current demand instructions to be executed in window III in FIG. 6, but not allow the eleventh ($11^{th}$) high current demand instruction to be executed without first inserting wait states in this example, as illustrated in FIG. 6. The hardware interlock(s) 10 limits the digital circuit 12 from demanding current beyond the capacity of the lower capacity mode of the power supply 14. By inserting wait states, the eleventh ($11^{th}$) high current demand instruction in window III is delayed from being executed by the digital circuit 12 to limit power demand. Note that the specifications of power demand by the digital circuit 12 in this example are for exemplary discussion purposes only. The digital circuit 12 is not limited to these power demand specifications provided in this example.

The power demand monitor 34 could be configured to determine the number of times that wait states were inserted by the hardware interlock(s) 10. For example, the power demand monitor 34 could maintain this number by a count stored in a counter. The power demand monitor 34 could be configured to monitor the count in the counter. If the count exceeds a defined threshold count indicative of an unacceptable power demand of the digital circuit 12, the power demand monitor 34 could cause the capacity mode selector 36 to cause the power supply 14 to switch to a higher capacity mode in response, as previously described with regard to FIGS. 4A and 4B.

Note that the hardware interlock(s) 10 could also be configured to govern other types of high current demand instructions to be performed by the digital circuit 12 based on their current demand to govern the power demand of the digital circuit 12 when the power supply 14 is in a lower capacity mode. Examples include, but are not limited to, load and/or store operations including accesses to cache memory, direct memory accesses (DMA), and flash memory writes. The power demand monitor 34 could monitor and/or count any of these governances individually or in combination in any manner desired when the power supply 14 is operating in a lower capacity mode, including but not limited to any of the methods previously described above for high current demand instructions. Further, if the digital circuit 12 included a CPU and other components on a single chip, for example graphic processors, universal serial bus (USB) controllers, etc., the hardware interlock(s) 10 could be configured to govern the power demand of any number of these other components in addition to or in lieu of the CPU, as desired, to limit the power demand from the power supply 14 and to switch the power supply 14 in a higher capacity mode when power demand of the digital circuit 12 exceeds a power demand threshold, as previously described.

The digital circuits 12, systems 18, power supply 14, and/or related methods described herein may be provided in discrete hardware, or both in hardware and software components. The hardware interlocks described herein are provided in hardware components and/or circuits. The digital circuits described herein may include any type of digital circuit, including but not limited to a synchronous digital circuit, a CPU system, a memory circuit, or other system. Any of the components of a digital circuits or systems described herein can be in any voltage domain among a plurality of voltage domains as long as the digital circuits or systems are powered by a power supply providing a sufficient voltage level to keep the digital circuit functional, if required by the technology and/or design of the digital circuit. If the digital circuit is or is employed in a memory circuit or system, the memory circuit or system may employ any type of memory. Examples include, without limitation, static random access memory (RAM) (SRAM), dynamic RAM (DRAM), synchronous DRAM (SDRAM), data-double-rate (DDR) SDRAM, data-double-rate-two (DDR2) SDRAM, data-double-rate-three (DDR3) SDRAM, Mobile DDR (MDDR) SDRAM, low-power (LP) DDR SDRAM, and LP DDR2 SDRAM.

The digital circuits 12, systems 18, and/or power supply 14 according to the designs and methods discussed herein may be included or integrated in a semiconductor die, integrated circuit, and/or device, including an electronic device and/or processor-based device or system. Examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

Figure 7:
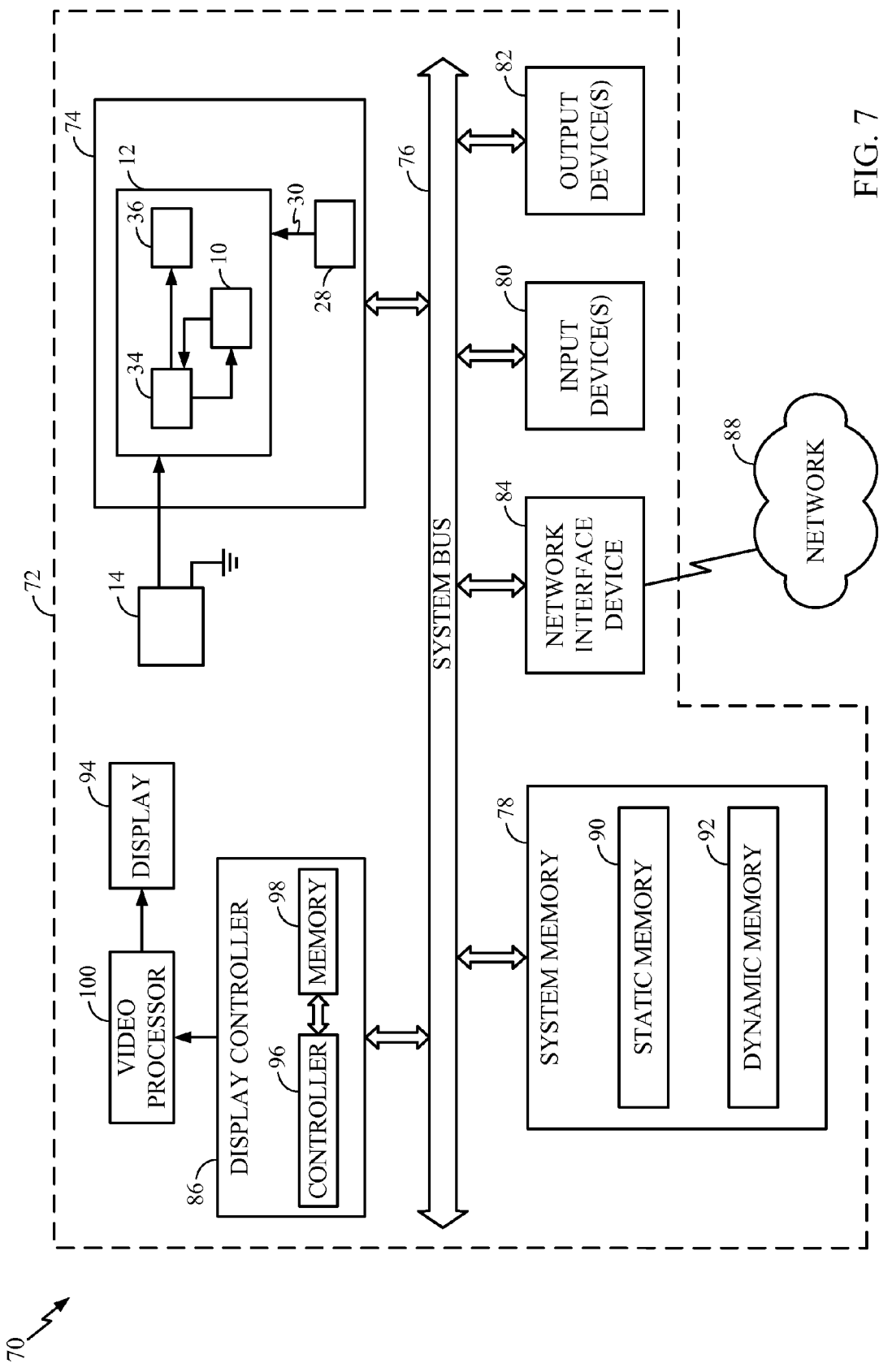
FIG. 7 is a block diagram of an exemplary central processing unit (CPU) circuit and related system employing at least one hardware interlock for limiting power demand of the CPU and generating an operating mode signal to set the current operating mode of a power supply to a higher capacity mode if at least one hardware interlock is limiting power demand of the CPU beyond a power demand threshold.

FIG. 7 illustrates a processor-based system 70 that may employ the digital circuit 12 including hardware interlock(s) 10, the power supply 14, and/or other circuits and components previously described above. The processor-based system 70 may be included in an electronic device 72. The digital circuit 12 is included in a CPU 74 in this embodiment. The CPU 74 is coupled to a system bus 76, which interconnects the other devices included in the processor-based system 70. As is well known, the CPU 74 can communicate with these other devices by exchanging address, control, and data information over the system bus 76. These devices may include any types of devices. As illustrated in FIG. 7, these devices may include system memory 78, one or more input devices 80, one or more output devices 82, a network interface device 84, and a display controller 86, as examples.

The one or more input devices 80 may include any type of input device, including but not limited to input keys, switches, voice processors, etc. The one or more output devices 82 may include any type of output device, including but not limited to audio, video, other visual indicators, etc. The network interface device 84 may be any device configured to allow exchange of data to and from a network 88. The network 88 may be any type of network, including but not limited to a wired or wireless network, private or public network, a local area network (LAN), a wide local area network (WLAN), and the Internet. The network interface device 84 may support any type of communication protocol desired.

The CPU 74 may also access the system memory 78 over the system bus 76. The system memory 78 may include static memory 90 and/or dynamic memory 92. The CPU 74 may also access the display controller 86 over the system bus 76 to control information sent to a display 94. The display controller 86 may include a memory controller 96 and memory 98 to store data to be sent to the display 94 in response to communications with the CPU 74. The display controller 86 communicates the display information to the display 94 via a video processor 100, which processes the information to be displayed into a format suitable for the display 94. The display 94 may include any type of display, including but not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope herein.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electro-magnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of dynamically controlling a power supply configuration, comprising:
    governing power demand of a digital circuit by at least one hardware interlock limiting instructions executed by the digital circuit, when a current operating mode of a power supply providing power for the digital circuit is a lower capacity mode;
    monitoring the power demand of the digital circuit by monitoring the instructions when the power demand is governed by the at least one hardware interlock;
    detecting when the at least one hardware interlock limits the power demand of the digital circuit based on the monitoring of the power demand of the digital circuit; and
    if the at least one hardware interlock limits the power demand of the digital circuit beyond a power demand threshold, generating an operating mode signal to set the current operating mode of the power supply to a higher capacity mode.

2. The method of claim 1, further comprising if the at least one hardware interlock is not limiting the power demand of the digital circuit, not generating the operating mode signal to change the current operating mode of the power supply.

3. The method of claim 1, further comprising generating the operating mode signal to set the current operating mode of the power supply to the lower capacity mode.

4. The method of claim 3, further comprising enabling the at least one hardware interlock when the power supply is in the lower capacity mode.

5. The method of claim 1, further comprising disabling the at least one hardware interlock when the power supply is in the higher capacity mode.

6. The method of claim 5, further comprising detecting if enabling the at least one hardware interlock would not limit the power demand of the digital circuit.

7. The method of claim 6, further comprising generating the operating mode signal to set the current operating mode of the power supply to the lower capacity mode if enabling the at least one hardware interlock would not limit the power demand of the digital circuit.

8. The method of claim 6, further comprising not generating the operating mode signal to set the current operating mode of the power supply to the lower capacity mode if enabling the at least one hardware interlock would limit the power demand of the digital circuit.

9. The method of claim 1, wherein governing the power demand of the digital circuit by the at least one hardware interlock further comprises limiting a number of defined instruction types executed by the digital circuit in a given period of time.

10. The method of claim 1, wherein governing the power demand of the digital circuit by the at least one hardware interlock comprises limiting defined instructions executed by the digital circuit based on a current demand of the instructions.

11. A circuit, comprising:
    at least one hardware interlock configured to limit instructions executed by a digital circuit when a current operating mode of a power supply providing power for the digital circuit is a lower capacity mode;
    a power demand monitor configured to monitor the instructions when power demand is governed by the at least one hardware interlock;
    the power demand monitor further configured to detect if the at least one hardware interlock limits the power demand of the digital circuit based on the monitored instructions of the digital circuit; and
    a capacity mode selector configured to generate an operating mode signal to set the current operating mode of the power supply to a higher capacity mode if the at least one hardware interlock limits the power demand of the digital circuit beyond a power demand threshold.

12. The circuit of claim 11, wherein the capacity mode selector is configured to not generate the operating mode signal to change the current operating mode of the power supply if the at least one hardware interlock is not limiting the power demand of the digital circuit.

13. The circuit of claim 11, wherein the capacity mode selector is further configured to generate the operating mode signal to set the current operating mode of the power supply to the lower capacity mode.

14. The circuit of claim 11, wherein the power demand monitor is further configured to enable the at least one hardware interlock when the power supply is in the lower capacity mode.

15. The circuit of claim 11, wherein the power demand monitor is further configured to disable the at least one hardware interlock when the power supply is in the higher capacity mode.

16. The circuit of claim 15, wherein the power demand monitor is further configured to detect if enabling the at least one hardware interlock would not limit the power demand of the digital circuit.

17. The circuit of claim 16, wherein the capacity mode selector is further configured to generate the operating mode signal to set the current operating mode of the power supply to the lower capacity mode if enabling the at least one hardware interlock would not limit the power demand of the digital circuit.

18. The circuit of claim 16, wherein the capacity mode selector is further configured to not generate the operating mode signal to set the current operating mode of the power supply to the lower capacity mode if enabling the at least one hardware interlock would limit the power demand of the digital circuit.

19. The circuit of claim 11 integrated in at least one semiconductor die.

20. The circuit of claim 11, further comprising a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the circuit is integrated.

21. A circuit, comprising:
a means for governing power demand of a digital circuit by limiting instructions executed by the digital circuit, when a current operating mode of a power supply providing power for the digital circuit is a lower capacity mode;
a means for monitoring the power demand of the digital circuit by monitoring the instructions when the power demand is governed by at least one hardware interlock;
a means for detecting if the means for governing the power demand of the digital circuit limits the power demand of the digital circuit based on the means for monitoring the power demand of the digital circuit; and
a means for generating an operating mode signal to set the current operating mode of the power supply to a higher capacity mode if the at least one hardware interlock limits the power demand of the digital circuit beyond a power demand threshold.

22. The method of claim 1, wherein governing the power demand of the digital circuit further comprises the at least one hardware interlock limiting higher current demand instructions executed by the digital circuit in a given period of time.

23. The method of claim 9, wherein governing the power demand of the digital circuit further comprises the at least one hardware interlock limiting the number of defined instruction types to be executed by the digital circuit based on a type of higher current demand instructions.

24. The method of claim 23, wherein governing the power demand of the digital circuit further comprises the at least one hardware interlock limiting the number of defined instruction types to be executed by the digital circuit over a running average of time.

25. The method of claim 24, wherein monitoring the power demand further comprises monitoring the number of defined instruction types to be executed by the digital circuit over the running average of time.

26. The method of claim 23, wherein governing the power demand of the digital circuit further comprises the at least one hardware interlock inserting at least one wait state in the type of the higher current demand instructions to be executed by the digital circuit.

27. The method of claim 26, wherein monitoring the power demand further comprises monitoring a number of the inserted at least one wait state.

28. The method of claim 26, wherein the power demand threshold is based on a number of the inserted at least one wait state.

29. The circuit of claim 11, wherein the at least one hardware interlock is further configured to limit a number of defined instruction types executed by the digital circuit in a given period of time.

30. The circuit of claim 11, wherein the at least one hardware interlock is further configured to limit defined instructions executed by the digital circuit based on a current demand of the defined instructions.

31. The circuit of claim 11, wherein the at least one hardware interlock is further configured to limit the higher current demand instructions executed by the digital circuit in a given period of time.

* * * * *